June 8, 1937. M. R. HUTCHISON, JR 2,083,381
MOTOR VEHICLE
Filed May 8, 1934 2 Sheets-Sheet 2
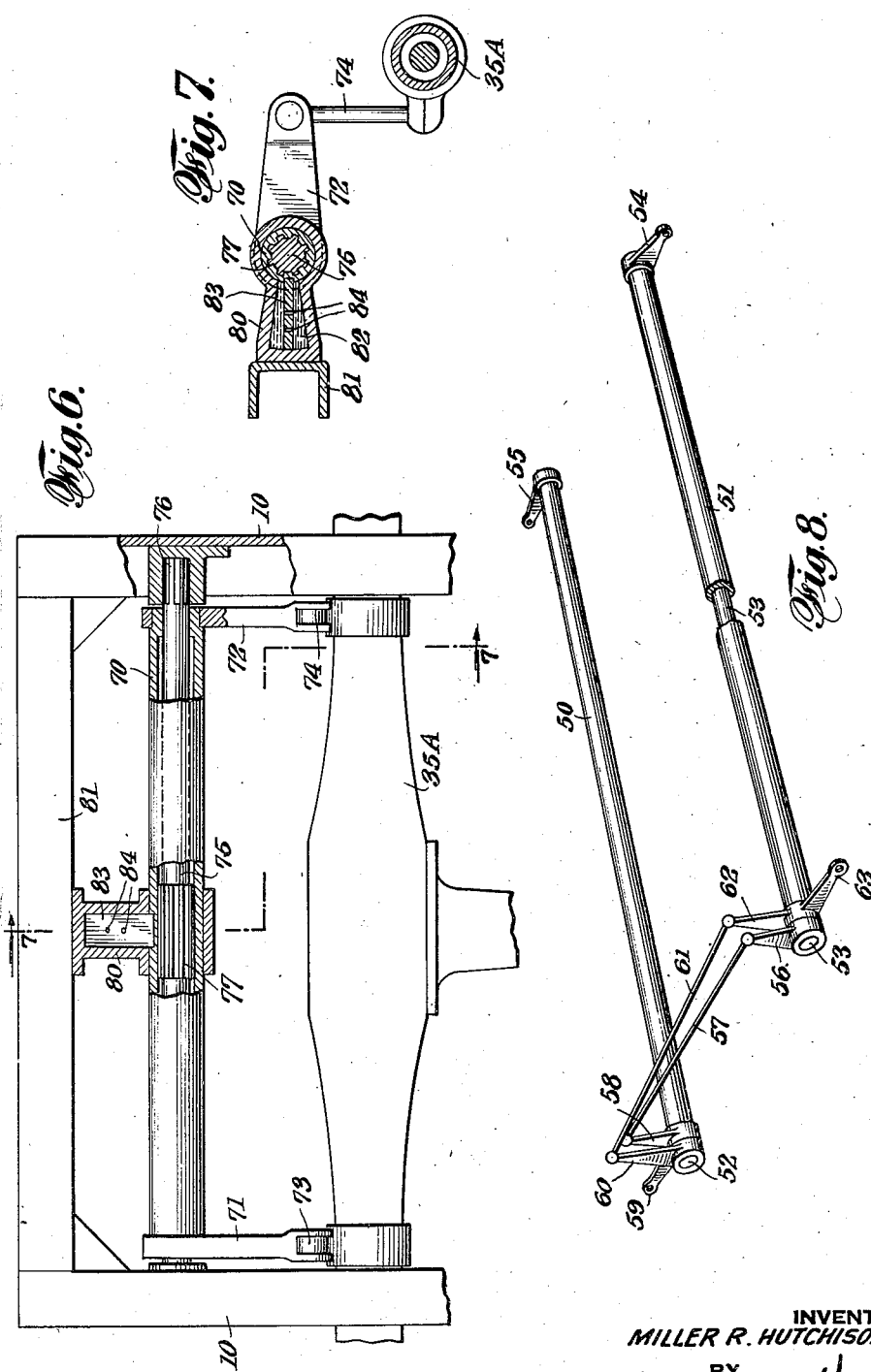
INVENTOR
MILLER R. HUTCHISON, JR.
BY
Marshall & Hawley
ATTORNEYS Patented June 8, 1937

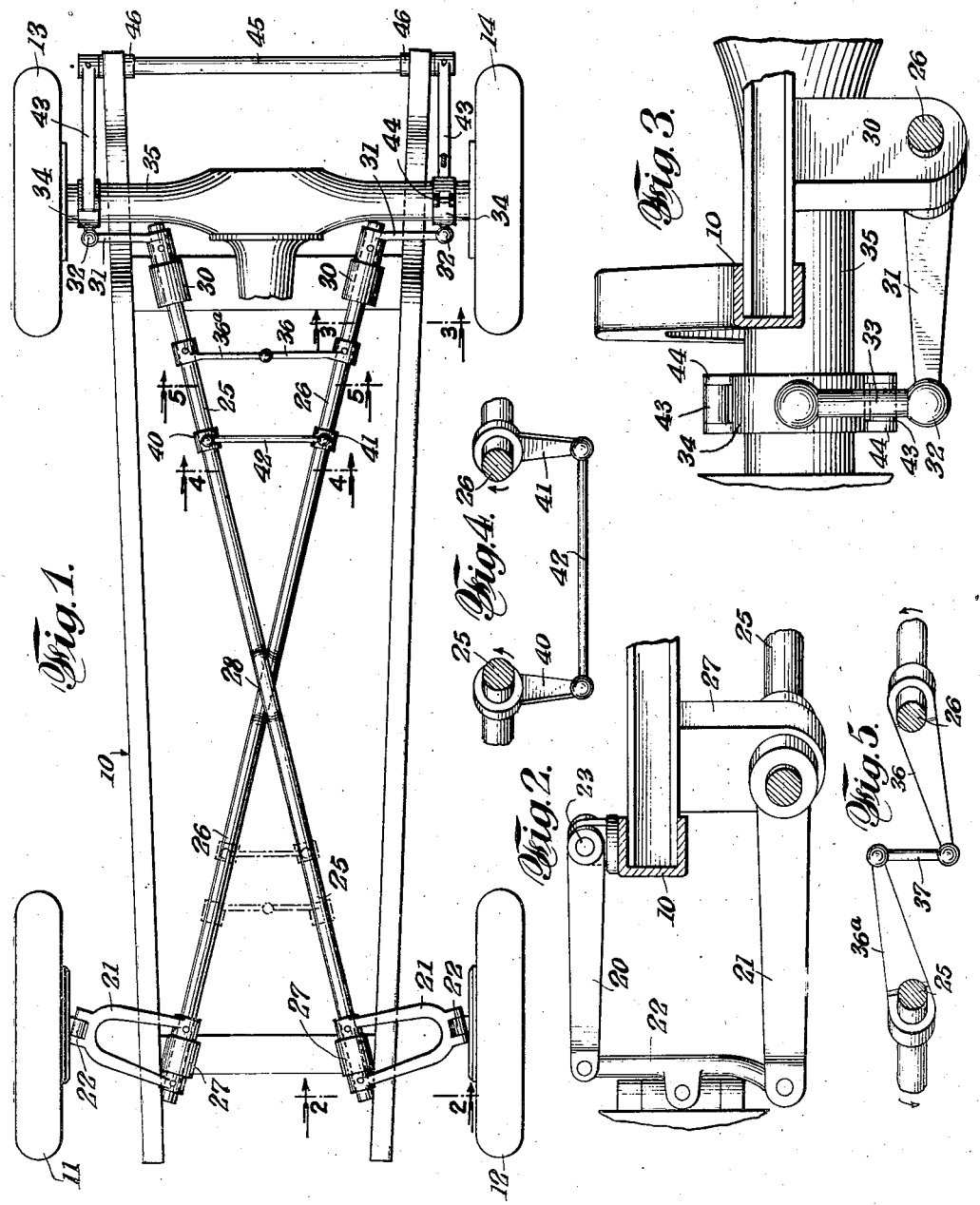

2,083,381

UNITED STATES PATENT OFFICE 2,083,381

MOTOR VEHICLE

Miller R. Hutchinson, Jr., Madison, N. J., assignor to Packard Motor Car Company, Detroit, Mich.

Application May 8, 1934, Serial No. 724,495

17 Claims. (Cl. 280—104)

This invention relates to motor vehicles and particularly to mechanism for stabilizing the vehicle.

Motor vehicle wheels are subjected to various movements or displacements as the vehicles are driven over uneven road surfaces. Furthermore, the starting, stopping or driving of a vehicle around corners also displaces the vehicle superstructure relative to the axles and surface on which the wheels are supported.

It has long been customary to support the superstructure of a motor vehicle on several individual compression springs which are usually located as close as possible to the individual wheels. Shock absorbers have been used in conjunction with the springs to dampen the movement of the superstructure and check the spring recoil, these elements individually also being similarly located.

The purpose of the suspension system, whatever its form, is to cushion the frame and superstructure of the vehicle against sudden displacements of the road wheels due to bumps; to stabilize the frame and superstructure against pitching and to stabilize the frame and superstructure against rolling.

Bumps are caused by road irregularities. The nature of the irregularities, acting through the wheels and suspension system upon the frame, may induce pitching and rolling of the latter, which motions may in addition and/or independently be induced by application of power and brakes, or turning, respectively.

A shortcoming of the conventional suspension system is that the individual spring when compressed by a road irregularity exerts not only an upward thrust against the frame but this thrust produces two turning moments about the principal axes, longitudinal and transverse, through the center of gravity of the frame and superstructure; hence, not only is the frame driven vertically but also made to pitch and roll. From these latter displacements arises more discomfort to the occupants than from cushioned vertical movement alone.

A further shortcoming of the conventional suspension system is that it is required to resist and damp out pitching and rolling of the frame which may arise from any of the causes mentioned. To govern pitching, those elements associated with the two front wheels act together, or are paired, and those with the two rear wheels likewise; but to resist roll, the pairing is of elements located at each side of front and rear axles. By elements is meant the combination of spring and shock absorber usually found. The resisting moments about the principal axes differ with this arrangement and while it is also true that the moment of inertia of the frame and superstructure about one axis is different than that about the other, and it might be possible so to proportion the spring rates and locations for a good result under some conditions, it is borne out by experience that a change of live load and/or of driving conditions, such as speed and road surface, will produce results not of a desirable order, with such an inflexible system. The latitude of choise of possible arrangements is limited in many ways.

An efficient vehicle suspension system should segregate the three functions of suspension and deal with each separately and individually.

Thus, the system should support the weight of the vehicle independently of giving it stability. By this token, displacement of the wheels in any order could not impart instability, but would displace the entire superstructure only in a vertical direction, cushioned by elastic deformation of the system.

Furthermore, the system should impart stability to the vehicle about one axis independently of supporting its weight or giving stability about the other axis. Freed from forces causing instability on account of road irregularities, this part, need only contend with the forces engendered by acceleration of the vehicle's mass in the appropriate plane normal to this axis, which forces cause moments and angular displacement about it.

Thirdly, the system should impart stability to the vehicle about the other axis independently of supporting its weight or giving it stability about the first axis, necessarily dealing only with acceleration forces and corresponding turning moments about this axis, to resist angular displacement about it.

This invention has for one of its objects to provide simple, practical and efficient solutions for separately and individually stabilizing a motor vehicle superstructure against the various displacements to which the superstructure is subjected, such as pitching, rolling and vertical displacements and to provide for each the necessary elastic rate and damping characteristics independently of the others.

Another object of the invention is to provide simple, practical and efficient stabilizing mechanism so designed as to prevent angular displacement of the vehicle superstructure on account of road irregularities.

Another object of the invention is to provide simple and efficient stabilizing mechanism so designed as to minimize pitching of the vehicle or displacement about an axis transverse to the frame or chassis.

Another object of the invention is to provide a simple and efficient mechanism of the character described for stabilizing the vehicle against side sway or rolling.

Further objects of the invention will appear from the following specification taken in connection with the drawings which form a part of this application, and in which Fig. 1 is a bottom plan view of a motor vehicle chassis or frame having stabilizing mechanism constructed in accordance with the invention;

Fig. 2 is an end elevation partly in section taken on line 2—2 of Fig. 1 showing on an enlarged scale the connection between the torsional springs and one of the wheels;

Fig. 3 is an enlarged sectional elevation taken substantially on line 3—3 of Fig. 1 and looking in the direction of the arrows, illustrating the connection between the rear end of one of the torsional springs and the rear axle housing;

Figs. 4 and 5 are sectional elevations taken substantially on lines 4—4 and 5—5 of Fig. 1 looking in the direction of the arrows, and showing the inter-connections between the diagonal springs for resisting pitching and rolling respectively, of the vehicle superstructure;

Fig. 6 is a top plan view partly in section showing a structure designed to resist pitching and rolling of the superstructure, this view showing a portion of the rear end of the chassis;

Fig. 7 is a sectional elevation taken substantially on line 7—7 of Fig. 6 showing a shock absorber connected to the stabilizing mechanism shown in Fig. 6; and Fig. 8 is a perspective view illustrating a modified construction of the stabilizing rods shown in Fig. 1.

The invention briefly described comprises vehicle suspension and stabilizing mechanism including torsion rods which are individually connected across the vehicle chassis from each front wheel to the diagonally opposite rear wheel and are so constructed and arranged as to resist and cushion vertical displacements, pitching and rolling of the superstructure due to accelerations and uneven road surfaces. By means of the cross connections of the wheels by the torsion rods the load sustained by a front wheel is always in fixed proportion to that sustained by the diagonally opposite rear wheel as long as the superstructure remains level. Bearing reactions on the chassis are similarly proportional. The diagonal rod is thereby placed in torsion in which wise it acts as a spring and cushions the vehicle superstructure. Furthermore, inter-connections are provided between the torsion rods to effect resistance to pitching of the vehicle superstructure about an axis transverse to the chassis or frame and rolling about an axis longitudinal of the chassis or frame.

In another form of the invention the rolling and pitching movements are resisted by a tubular cross member extending transversely of the frame and connected to the axle or axles in such a way as to place the cross member under a torsional strain by the rolling displacement of the superstructure. This embodiment of the invention also includes a torsion member fixedly connected to the frame and also fixedly connected to the tubular member at the central portion thereof, this construction being designed to resist pitching of the vehicle.

Further details of the invention will appear from the following description.

In the form of the invention illustrated in Figs. 1 to 5 inclusive, there is shown a vehicle frame or chassis 10 supported by a pair of front wheels 11 and 12 and a pair of rear wheels 13 and 14.

The front wheels are connected to the frame in a manner to permit individual movements of the two wheels relative to the frame. This connection may be made in any suitable manner and in Fig. 2 is shown as comprising a pair of links 20 and 21 to which there is pivoted at the outer ends a vertical link 22, the wheel being connected in any suitable manner to the link 22.

Link 20 is pivoted at 23 to the vertical frame 10 and link 21 is secured to a torsion rod 25 or 26 which is rotatably mounted in a bracket 27 depending from the frame 10.

In the form of the invention illustrated in Figs. 1 to 5 the torsion rods 25 and 26 extend diagonally across the frame from one end to the other end thereof, the central portions being offset, as shown at 28.

As above stated, the links 21 are fixedly connected to the torsion rods so that as the links move up and down due to the vertical displacement of the wheels the rods 25 or 26 will be placed under torsion.

The rods 25 and 26 are rotatably mounted adjacent their rear ends in brackets 30 connected to the frame 10 and each rod has secured to the rear end thereof a lever arm 31, the other end of the arm being connected at 32 by a ball joint to a link 33 which in turn is connected by a ball joint to a bracket 34 clamped to the rear axle housing 35.

From the foregoing description it will be obvious that an upward movement of one of the front wheels will cause a corresponding upward movement of the link 21 which will tend to rotate the torsion rod connected to that link. This tendency, however, is counteracted by the effect of the lever arm 31 on the opposite end of the torsion rod, since the arms 21 and 31 extend in opposite directions from the torsion rods. Therefore, since the end of the rear axle which is cross connected to the front wheel cannot move downwardly the torsion rod is placed in torsion or twisted, both vehicle tires and the torsional springing cushioning the shock due to the vertical displacement of either wheel. As the load sustained by the individual wheel will be inversely proportional to the length of the associated lever, and the chassis bearing reactions likewise, the length of the front and rear levers are made such that the resultant of thrusts upon the chassis at the bearings will be inversely proportional to the lever arm of each bearing about the center of gravity, i. e. the resultant chassis reaction will be equivalent to a single vertical force passing through its center of gravity, and hence no angular disturbance of the superstructure, pitch or roll, due to bumps, will occur.

The rear axle, in addition to its connections to the lever arms 31, is connected to the frame in a manner to absorb the driving torque reaction. In the embodiment of the invention shown, arms 43 are connected to brackets 44 fixedly connected to the axle housing 35 and are fixedly connected at their other ends to the ends of a tubular member 45 rotatably mounted in bearings 46 in the ends of the frame 10.

Body roll or rolling of the superstructure will tend to cause unequal angular movements of the arms 43 which will be resisted by the torsion reaction of the cross tube 45.

The torsion rods 25 and 26 are also utilized to prevent pitching and rolling or side sway of the chassis. When the vehicle rolls the torsion rods 25 and 26 viewed from the end of the vehicle are rotated or turned in the same direction. In order to resist rolling, restraint is placed upon this tendency of the cross rods to rotate in the same direction. This is accomplished by means of the structure illustrated in Figs. 1 and 5. A lever arm 36 is secured to the torsion rod 26 and an arm 36a is secured to and extends in the opposite direction from the torsion rod 25. These arms are connected by a link 37 which has a ball connection with each arm. From a showing particularly in Fig. 5 it will be evident that the rotation of the rods 25 and 26 in a like direction will tend to move the arms 36 and 36a apart. This movement is, however, prevented by the link 37, thus restraint is placed upon the rotation of the torsion rods 25 and 26 in the same direction due to rolling or side sway of the vehicle chassis or frame.

The torsion rods 25 and 26 may also be utilized to resist pitching of the vehicle or displacement about an axis transverse to the chassis or frame. This is accomplished by providing arms 40 and 41 which are connected respectively to the torsion rods 25 and 26, the outer ends of the arms being connected by ball joints to a link 42.

When the vehicle tends to pitch or swing on an axis transverse to the frame or chassis the torsion rods 25 and 26 will be rotated in opposite directions. From the showing in Fig. 4 it will be seen that a tendency of the rods to move in the direction of the arrows will tend to move the arms 40 and 41 toward each other, but this movement is resisted by the link connection 42, thus restraint is placed on the torsional movement of the arms 25 and 26 in opposite directions and therefore pitching displacement is resisted by the torsional stiffness of the diagonal rods.

The cross connections shown in Figs. 4 and 5 between the torsion rods 25 and 26 may be so located with reference to the lengths of the torsion rods as to best accomplish their functions. The greater the length of diagonal rod between the restraining means and the wheel connections, the more yielding the restraint placed upon the motion concerned, so that a single restraining means to control pitching, for example, located nearer the rear axle than the front will provide a higher rate of resistance at the rear end than the front. This also applies to restraining means against rolling and one or two of each may be used optionally. Thus, similar connections located nearer the front end portions of the torsion rods 25 and 26 are shown in dotted lines.

The structure shown in Fig. 8 operates in a manner similar to the crossed torsion rods 25 and 26 shown in Fig. 1. However, in Fig. 8 the torsion rods are shown as parallel and it will be understood that they will be located at the sides of the chassis or frame. At the two sides of the frame will be located tubular torsion members 50 and 51. Within these members are mounted torsion rods 52 and 53. An arm 54 is secured to the rear end of the torsion members 51 and 53 and an arm 55 is secured to the rear end of the torsion members 50 and 52.

An arm 56 is secured to the front end of the tubular member 53 and is connected by a link 57 to a bell crank lever having a pair of arms 58 and 59. The bell crank lever is secured to the front end of the torsional tubular member 50.

The front end of the torsional rod 52 has secured thereto an arm 60 which is connected by a link 61 to a bell crank lever comprising a pair of arms 62 and 63, the bell crank lever being secured to the front end portion of the torsional tubular member 51.

The arms 54 and 55 will be connected to the rear axle of the vehicle in the manner similar to the arms 31 shown in Fig. 3.

The arms 59 and 63 will be connected to the front wheel mounts in the manner similar to the arms 21 in Fig. 2.

It will be obvious that an upward movement of the wheel connected to the arm 63 will be communicated through the bell crank lever 63, 62, link 61, arm 60 and rod 52 to the arm 55 which is connected to the rear wheel on the other side of the vehicle. Similarly the upward movement of the arm 59 will cause the bell crank lever 59, 58 to communicate this movement through link 57, arm 56, torsion rod member 51 to the arm 54 and connected wheel axle. This structure therefore operates in the manner similar to the operation of the diagonally disposed torsion rods 25 and 26 shown in Fig. 1.

Longitudinal tubular members 50, 51 interconnect wheels on the same side of the vehicle and are flexed when the vehicle pitches, to resist pitching but have no influence on rolling. At the same time, as one front wheel is raised by a bump the tubular member tends to raise the other wheel on the same side of vehicle, so to compensate partly for the increase of loading on that side and so acting to stabilize the vehicle in addition to the balancing of forces through the equivalent of the diagonal suspension. It is intended that a transverse stabilizer against rolling be used with this system. The rates of torsional springing of the members 51 and 53 will differ from one another according to requirements.

In Figs. 6 and 7 there is shown another form of mechanism for resisting pitching and rolling. This structure comprises a tubular torsion member 70 which is fixedly connected to a pair of arms 71 and 72 which in turn are connected by links 73 and 74 to the axle housing 35A. As the chassis tends to roll or be displaced about an axis longitudinal of the frame the link connections will tend to twist the torsion tubular member 70 placing this member under torsional strain. The torsional resistance to twisting opposes the rolling movement.

This mechanism also includes means for preventing pitching. This is accomplished by a rod 75 which is fixed at its ends, as shown at 76, to the vehicle frame 10. The rod 75 is splined or otherwise fastened, as shown at 77, at its central portion to the central portion or neutral section in twisting of the tubular torsion member 70. When the vehicle pitches about an axis transverse to the chassis frame all parts of the member 70 tend to move in a common angular direction with equal amplitude without offering resistance, but this is prevented by the torsion rod 75 through the splined connection 77. Thus, the combined torsional deflection of members 70 and 75, in series, opposes the pitching. The rolling or side sway of the chassis will cause a twisting movement of the tubular member 70 about its longitudinal axis. The central or neutral portion, however, has practically no movement and the splined connection 77 and torsion rod 75 will therefore have no influence on the action during rolling.

Similarly, the provision of a shock absorber at the central portion of the member 70 will accomplish damping of pitching without influencing rolling. Any desired form or type of shock absorber may be used and in Figs. 6 and 7 there is shown a device comprising a casing 80 which is fixed to a cross frame member 81 and is filled with a suitable hydraulic medium 82. A vane 83 is mounted in the casing 80 and is secured to the tubular member 70. Thus, any tendency of the tubular member to rotate due to pitching of the vehicle will be resisted by the liquid in the casing 80. The vane 83 may have bleed holes or openings 84 or may have sufficient clearance to permit oscillatory movement of the vane in the casing, the movement being resisted by the throttling of the liquid.

From the foregoing description it will be evident that suitable means has been designed individually and selectively to restrain displacements of the vehicle superstructure by pitching, rolling or vertical movements. Furthermore, by segregating the three component functions and providing efficient compensation in each case the support and stabilizing of the vehicle have been effected in a simple, practical and efficient manner.

These ends are accomplished, as above described, by using torsion bars or rods associated with diagonally opposite road wheels of the vehicle, whose full length effects vertical cushioning with vertical support; whose length is in part made effective between wheels common to one axle, for both axles at the same or different rates, by interconnection in one fashion, to resist rolling; and whose length is in part made effective between wheels common to one side of the vehicle, for both sides at the same rate, by interconnection in another fashion; and one interconnection does not affect the other, nor either or both of them affect vertical support of the entire superstructure.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In a motor vehicle, a chassis, wheels arranged to support the chassis, a pair of torsion rods carried by the chassis each operatively connected to a front wheel at one side of the vehicle and to a rear wheel on the other side of the vehicle, and means connecting said rods for restricting rotational movements of said rods in the same direction.

2. In a motor vehicle, a chassis, wheels arranged to support the chassis, a pair of torsion rods carried by the chassis each operatively connected to a front wheel at one side of the vehicle and to a rear wheel on the other side of the vehicle, and means connecting said rods for restricting rotational movements of said rods in opposite directions.

3. In a motor vehicle, a chassis, wheels arranged to support the chassis, a pair of torsion rods carried by the chassis each operatively connected to a front wheel at one side of the vehicle and to a rear wheel on the other side of the vehicle, means connecting said rods for restricting rotational movements of said rods in the same direction, and means connecting said rods for resisting rotational movements of said rods in opposite directions.

4. In a motor vehicle, a chassis, wheels arranged to support the chassis, and a pair of torsion rods carried by the chassis each disposed diagonally of the chassis and operatively connected to a front wheel at one side of the vehicle and to a rear wheel on the other side of the vehicle and means connecting said rods for restricting rotational movement of said rods in the same direction.

5. In a motor vehicle, a chassis, wheels arranged to support the chassis, a pair of torsion rods carried by the chassis each disposed diagonally of the chassis and operatively connected to a front wheel at one side of the vehicle and to a rear wheel on the other side of the vehicle, and means connecting said rods for resisting rotational movements of said rods in opposite directions.

6. In a motor vehicle, a chassis, wheels arranged to support the chassis, and torsion means operatively connected to the wheels and carried by the chassis for resisting tilting movement of the chassis relative to the longitudinal axis thereof, said wheels and torsion means being so connected that an upward movement of a wheel on one side of the vehicle will tend to cause a downward movement of a wheel on the other side of the vehicle, these relative movements being resisted by the torsional resistance of the torsion means.

7. In a motor vehicle, a chassis, wheels arranged to support the chassis, and torsion means operatively connected to the wheels and carried by the chassis for resisting tilting movement of the chassis relative to the longitudinal axis thereof, said wheels and torsion means being so connected by levers and links that an upward movement of a wheel on one side of the vehicle will tend to cause a downward movement of a wheel on the other side of the vehicle, these relative movements being resisted by the torsional resistance of the torsion means.

8. In a motor vehicle, a chassis, wheels arranged to support the chassis and a pair of separate, independently acting torsion rods rotatably mounted on said chassis, each rod having a laterally extending arm at each end thereof, said arms on each rod extending in opposite directions, the arm at the front end of each rod being connected to a front wheel and the rear arm of each rod being connected to the rear wheel on the opposite side of the vehicle from the front wheel connected to the other end of said rod.

9. In a motor vehicle, a chassis, wheels arranged to support the chassis and a pair of separate, independently acting torsion rods rotatably mounted on and diagonally disposed on said chassis, each rod having a laterally extending arm at each end thereof, said arms on each rod extending in opposite directions, the arm at the front end of each rod being connected to a front wheel and the rear arm of each rod being connected to the rear wheel on the opposite side of the vehicle from the front wheel connected to the other end of said rod.

10. In a motor vehicle, a chassis, wheels arranged to support the chassis, torsion rods carried by the chassis and operatively connected to the wheels in a manner to cause angular reactions on opposite sides of the vehicle and thereby resist tilting movement of the chassis relative to the longitudinal axis thereof, and means including arms on said rods, extending in substantially the same direction and a link connecting said arms and coacting with said torsion means for resisting tilting of the frame relative to an axis transverse thereto.

11. In a motor vehicle, a chassis, wheels arranged to support the chassis, torsion rods carried by the chassis and operatively connected to the wheels in a manner to cause angular reactions on opposite sides of the vehicle and thereby resist tilting movement of the chassis relative to the longitudinal axis thereof, and means including lever arms connected to and coacting with said torsion rods and a link connecting the arms for resisting rotation or torsional movement of the rods, thereby checking rolling or side sway.

12. In a motor vehicle, a chassis, wheels arranged to support the chassis, torsion rods carried by the chassis and operatively connected to the wheels in a manner to cause angular reactions on opposite sides of the vehicle and thereby resist tilting movement of the chassis relative to the longitudinal axis thereof, and means including lever arms carried by said rods and extending in opposite directions for resisting rotation or torsional movement of the rods, thereby checking rolling or side sway.

13. In a motor vehicle, a chassis, wheels arranged to support the chassis, torsion rods extending longitudinally of and rotatably mounted on the chassis, oppositely extending arms at the ends of said rods, each arm being operatively connected to a wheel, means connecting and coacting with said torsion rods for resisting rolling or side sway of the chassis, and means connecting and coacting with the rods for resisting tilting of the chassis relative to an axis transverse thereto.

14. In a motor vehicle, a chassis, wheels arranged to support the chassis, torsion rods extending longitudinally of and rotatably mounted on the chassis, oppositely extending arms at the ends of said rods, each arm being operatively connected to a wheel, and means connecting and coacting with said torsion rods for limiting the rotation of said rods in the same direction.

15. In a motor vehicle, a chassis, wheels arranged to support the chassis, torsion rods extending longitudinally of and rotatably mounted on the chassis, oppositely extending arms at the ends of said rods, each arm being operatively connected to a wheel, means connecting and coacting with said torsion rods for limiting rotation of said rods in the same direction, and means connecting and coacting with said rods for limiting the rotation of said rods in opposite directions.

16. In a motor vehicle, a chassis, wheels arranged to support the chassis, and a pair of separate, independently acting, substantially straight, torsion rods each operatively connected adjacent one end thereof to a front wheel at one side of the vehicle and adjacent the other end thereof to a rear wheel on the other side of the vehicle, said rods being rotatably mounted on the chassis.

17. In a motor vehicle, a chassis, wheels arranged to support the chassis, and a pair of separate, independently acting, substantially straight, torsion rods each disposed diagonally of the chassis and operatively connected adjacent one end thereof to the front wheel at one side of the vehicle and adjacent the other end thereof to the rear wheel on the other side of the vehicle, said rods being rotatably mounted on the chassis.

MILLER R. HUTCHISON, Jr.